United States Patent
Rice et al.

(10) Patent No.: US 7,902,985 B2
(45) Date of Patent: Mar. 8, 2011

(54) GATEWAY RADIO FREQUENCY IDENTIFICATION TAG SYSTEM

(75) Inventors: Christopher Rice, Parsippany, NJ (US); Thomas Killian, Westfield, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 375 days.

(21) Appl. No.: 11/999,398

(22) Filed: Dec. 5, 2007

(65) Prior Publication Data

US 2009/0146812 A1     Jun. 11, 2009

(51) Int. Cl.
*G08B 13/14* (2006.01)

(52) U.S. Cl. .............. 340/572.4; 340/568.1; 340/825.49; 340/10.1

(58) Field of Classification Search .............. 340/572.4, 340/572.1, 572.2–572.3, 572.5–572.9, 568.1, 340/539.1, 10.1, 505, 5.92, 539.13, 825.49
See application file for complete search history.

(56) References Cited

U.S. PATENT DOCUMENTS

| | | | | |
|---|---|---|---|---|
| 7,068,148 | B2 * | 6/2006 | Shanks et al. | 340/10.1 |
| 7,295,108 | B2 * | 11/2007 | Corrado et al. | 340/539.22 |
| 7,573,386 | B2 * | 8/2009 | Lahiri | 340/572.1 |
| 7,633,392 | B2 * | 12/2009 | Neuwirth | 340/572.1 |
| 2006/0145815 | A1 * | 7/2006 | Lanzieri et al. | 340/10.2 |
| 2008/0297312 | A1 * | 12/2008 | Moshfeghi | 340/10.1 |
| 2009/0021343 | A1 * | 1/2009 | Sinha | 340/5.2 |

* cited by examiner

*Primary Examiner* — Daniel Previl

(57) ABSTRACT

The specification describes a new architecture for RFID systems that is adapted to process large numbers of RFID tags and provide information about a large number of items. The system provides for multiple tag readers. The tag readers are active and have both transmit and receive capability. The system includes a gateway tag that receives information about individual items from the multiple readers and thus contains data on the entire inventory of items. This allows each of the multiple readers to conveniently access data for the entire inventory of items.

12 Claims, 3 Drawing Sheets

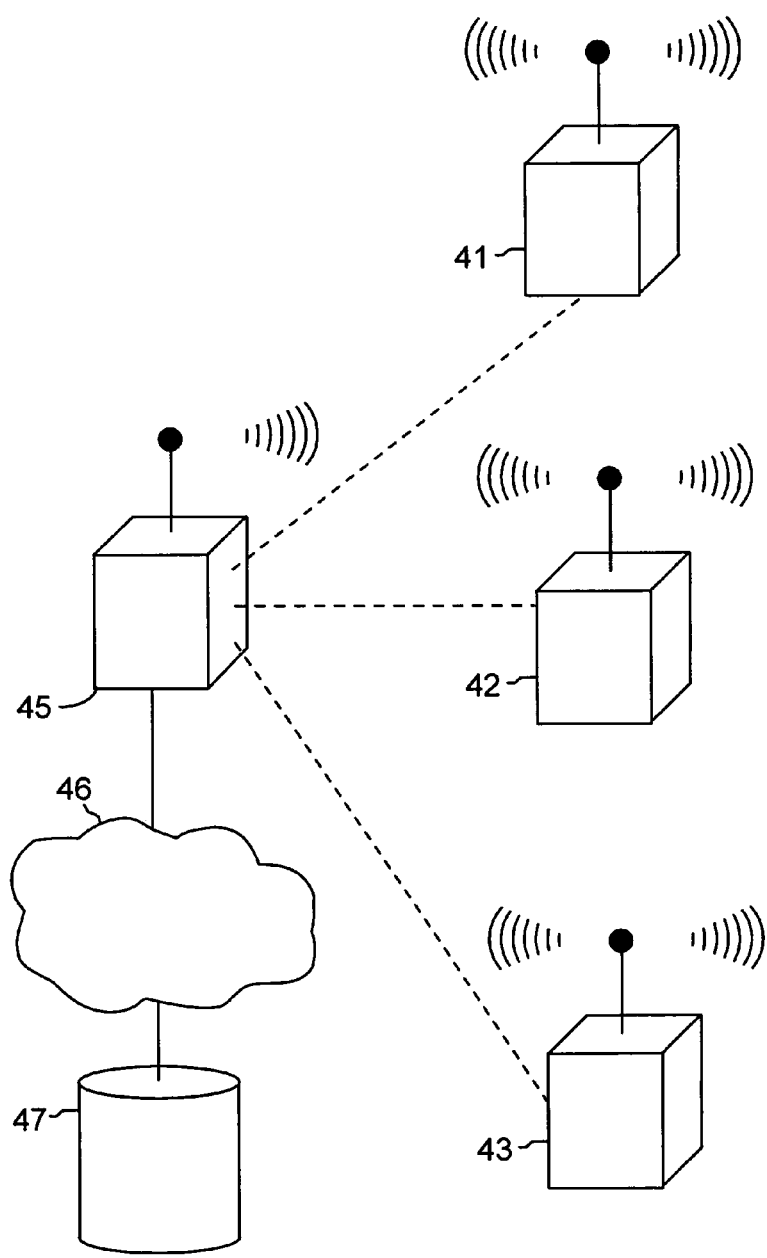
FIG. 4
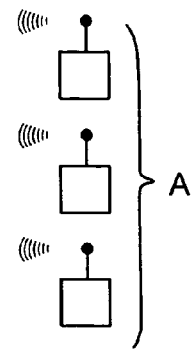
A
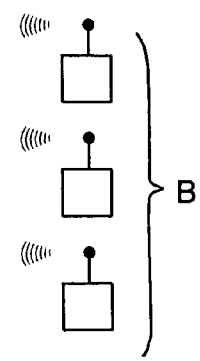
B
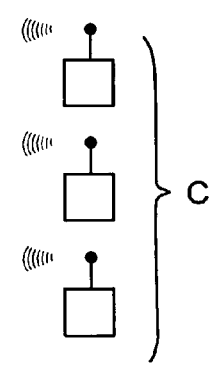
C

US 7,902,985 B2

GATEWAY RADIO FREQUENCY IDENTIFICATION TAG SYSTEM

FIELD OF THE INVENTION

This invention relates to a radio frequency identification (RFID) systems that use RFID tags to track product inventory, or other mobile items.

BACKGROUND OF THE INVENTION

Information management systems are being developed to track the location and/or status of a large variety of mobile entities such as products, vehicles, people, animals, etc. A widely used tracking technology uses so-called RFID tags that are placed physically on the items being tracked. Reference herein to "items" being tracked is intended to include the variety of entities just mentioned as well as, more commonly, product inventories.

RFID tags may be active or passive. Active tags typically have associated power systems and can transmit data over modest distances. Passive systems lack internal power but derive transmitting signal power from an incoming RF signal. However, transmitting distances with passive RFID tags are very limited. To read a large number of RFID tags, spread over a wide physical area, requires either a large number of RFID readers, or a reliable system of moving RFID readers. One proposed solution to this problem is to use active RFID tags on the products. However, active tags are relatively costly. Although they lend more function to a tracking system, and transmit more effectively, passive tags are typically more cost effective where inventories being tracked are large.

What is needed is an improved system for RFID tracking where the scale of the application exceeds the performance capability of conventional RFID approaches.

STATEMENT OF THE INVENTION

We have developed a new architecture for RFID systems that is adapted to process large numbers of RFID tags and provide information about a large number of items. The system provides for multiple tag readers. The tag readers are active and have both transmit and receive capability. The system includes a new element called a gateway tag that receives information about individual items from the multiple readers and thus contains data on the entire inventory of items. This allows each of the multiple readers to access data for the entire inventory of items. The gateway tag may interface with an information storage center that also contains data for the entire inventory of items.

BRIEF DESCRIPTION OF THE DRAWING

The invention may be better understood when considered in conjunction with the drawing in which:

FIG. 4 is a schematic view of the RFID tag system of the invention.

DETAILED DESCRIPTION OF THE INVENTION

Figure 1:
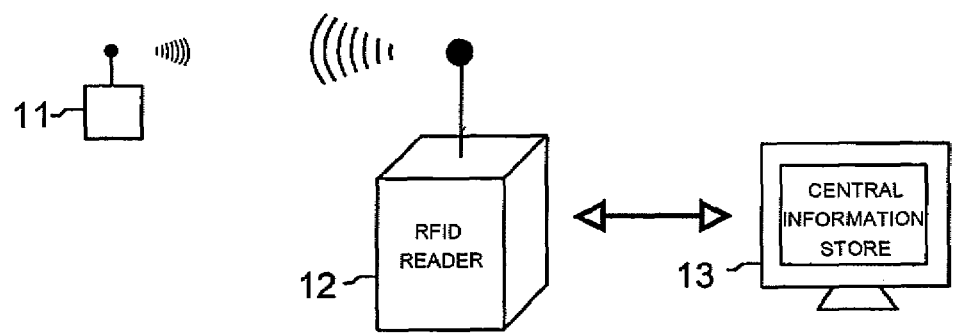
FIG. 1 is a schematic view of a typical RFID tag system.

FIG. 1 is a schematic representation of a typical RFID system wherein the RFID tag is shown at 11, the RFID reader at 12 and a central information store at 13. A wide variety of implementations are used for the function of tracking large numbers of items, many of which use the basic elements shown in FIG. 1. Typically, the RFID tag 11 is a passive device attached to the item being tracked. The reader 12 is an active RFID device that communicates with large numbers of passive RFID tags, and typically either stores data in the reader, and/or relays data to a central database 13. The central database keeps data for all items in the system. In many applications, for example, large retail outlets, the RFID readers are mobile devices that are moved around the vicinity of the RFID tags to record the RFID tag data. Mobility in this application is necessary since the transmission distance between the RFID tags and the RFID readers is very limited, for example, tens of meters maximum, and typically less than 10 meters. The RFID readers are typically powered, which extends the range of transmission between the RFID readers and a remotely located receiver. That allows the option of using a RFID reader to simply relay RFID tags to a central database. More typically, the reader reads the passive RFID and stores the information locally. This data may be downloaded to the central store periodically, by placing the reader in a docking device that is connected by wireless or hardwired link to the central database. In the latter case, a wireless link between the RFID reader and a remote receiver may or may not be used.

Figure 2:
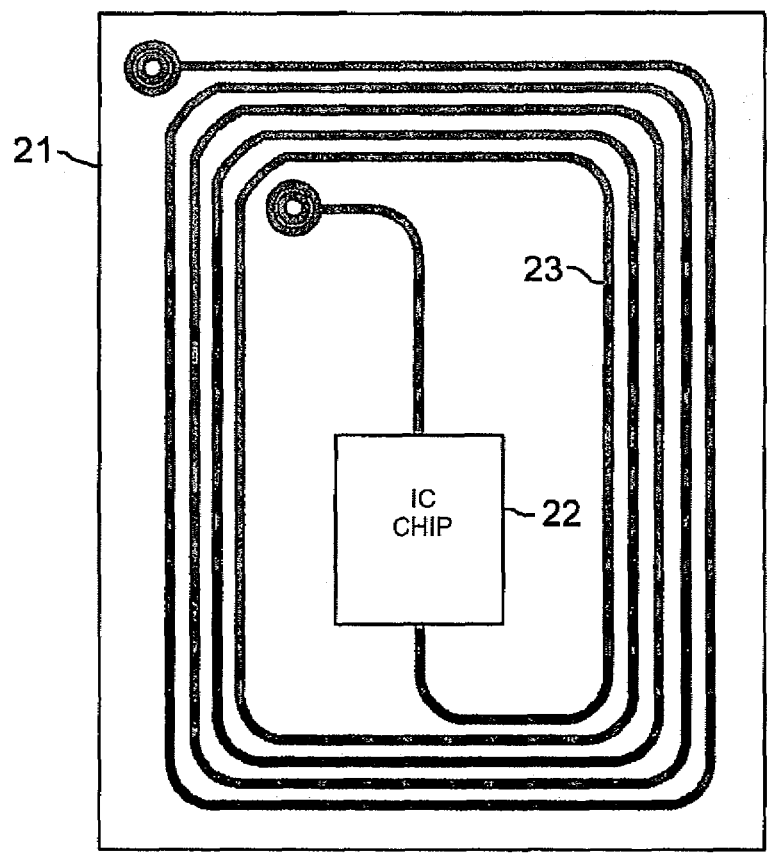
FIG. 2 is a representation of a passive RFID tag.

A passive RFID tag is shown at 21 in FIG. 2. RFID tags are miniaturized as much as practical to allow for the essential elements of a semiconductor IC chip 22, typically a CMOS chip, and an antenna 23. The IC chip contains a memory, usually a read-only memory encoded with item data. The antenna is a serpentine metal conductor that receives small amounts of power from the RFID reader by inductive coupling. When the IC chip is powered, it transmits item data back to the RFID reader via antenna 23.

Passive RFID tag designs are available in many sizes and designs. Common characteristics are a platform, an IC chip, and an antenna. Depending on the application the platform may be glass, ceramic, epoxy, paper, cardboard, or any suitable plastic. An onboard power source is not included in a passive RFID tag. All power for the tag is derived from RF signals in the vicinity of the tag. The tag responds to the reader using RF backscatter, which basically reflects the carrier wave from the reader after encoding data on the carrier wave. Variables in the communication specification include the frequency of the carrier, the bit data rate, the method of encoding and any other parameters that may be needed. ISO 18000 and EPCGlobal are the standards for this interface. The interface may also include an anti-collision protocol that allows more than one tag in the range of the reader to signal concurrently. There are many specific implementations of this, and these form no part of the invention.

Figure 3:
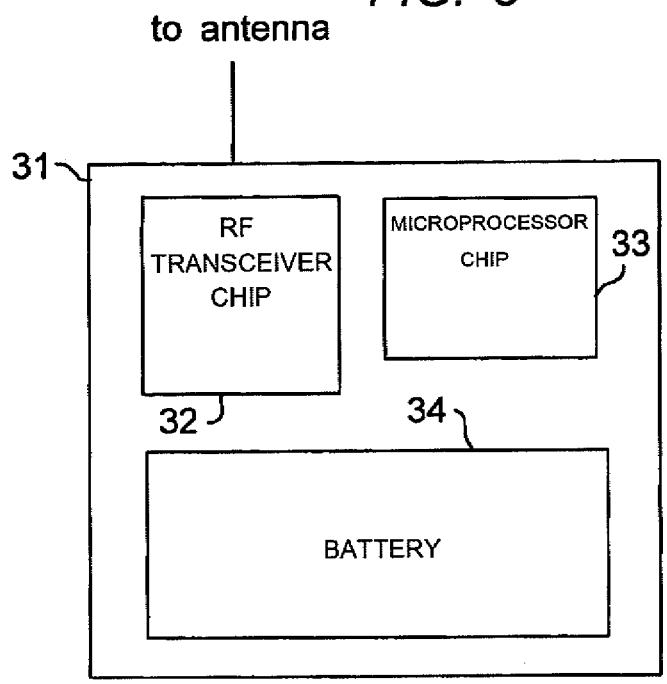
FIG. 3 is a representation of an active RFID reader.

A typical schematic for an RFID reader is shown in FIG. 3. The reader 31 includes RF transceiver chip 32, microprocessor chip 33, and battery 34. The transceiver chip communicates through an attached antenna as indicated. These components allow the reader to not only receive data from the passive RFID tags, but to store and process the data and transmit the data to another device or station. Since the reader is powered, it can transmit data over significant distances, for example, 100 to 3000 thousand feet.

A schematic of an RFID tag system according to the invention is shown in FIG. 4. The RFID tags are shown organized in groups A, B, and C. These groups may represent different departments in a retail outlet, separate floors or buildings in a warehouse complex, separate railroad cars or shipping containers, etc. In the arrangement shown, each group communicates with an associated RFID reader 41, 42, and 43. It should be understood that this arrangement is shown by way of example only. There are many alternative configurations using RFID tags and readers. The RFID readers communicate with gateway RFID tag 45. The link between the RFID readers and the gateway RFID tag may operate at a frequency different than the frequency used in the link between the RFID readers and the passive RFID tags. The readers collectively provide data to the gateway RFID tag for all of the items in the system. This arrangement allows any reader in the system to access data on any item in the system via the gateway RFID tag. Since the transmission to and from the gateway RFID tag to the RFID readers is powered, that link may be essentially any distance within the facility served by the RFID system. The gateway RFID tag may be a standalone unit, or, as indicated in FIG. 4, interfaced via network 46 to a central database and memory store 47. The network may be a wireless network, or a wired network (land line).

Figure 5:
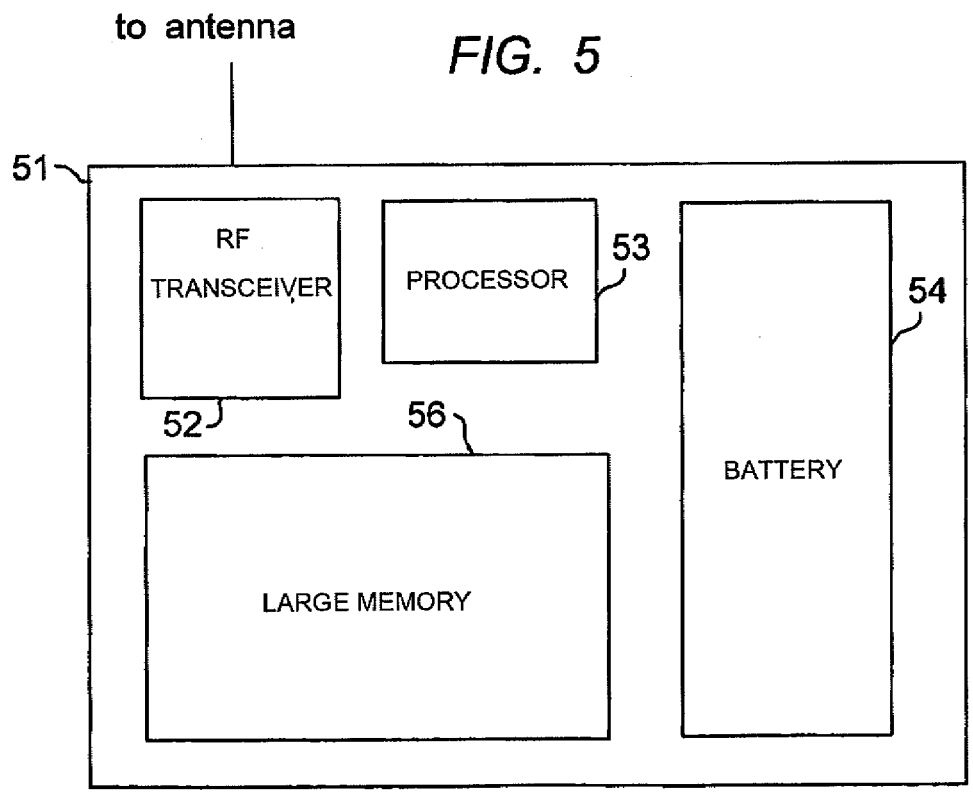
FIG. 5 is a representation of a gateway RFID tag according to the invention.

A schematic of the gateway RFID tag 45 in FIG. 4 is shown in FIG. 5. The gateway RFID tag is an active tag, with battery 54. It also has a processor 53, a large memory 56, and an RF transceiver 52. The gateway RFID tag interfaces with each of the RFID readers as shown in FIG. 4, and may interface with a central database via a wireless or wired network. The latter is an optional feature. The system may be designed with a direct interface between the RFID readers and the central database, as described in conjunction with FIG. 1, and with a parallel link between the RFID readers and the gateway RFID tag. Adding a link between the gateway RFID tag and the central database allows data consistency between the two to be verified. Both of these subsystems typically contain data on all of the items being tracked by the system, i.e. universal system data. However, using an arrangement like that shown in FIG. 4 allows the universal system data stored at the gateway RFID tag to be different (typically less detailed) than the data stored at the central database.

For the purpose of defining terms used herein, a passive RFID tag means a device containing at least an integrated circuit chip operating at a given frequency and an antenna, but no onboard power source. The antenna operates as a low power RF transceiver. The integrated circuit chip contains a memory. An RFID reader means a device containing at least an integrated circuit chip, an antenna, an RF transmitter, an RF receiver, and a power source. The integrated circuit chip in the RFID reader contains a memory. The RFID reader has an RF transmitter that operates at the same frequency as the RFID tags, and an RF transmitter that may operate at a frequency different from that of the RFID tags. A gateway RFID tag means a device containing at least an integrated circuit chip, an antenna, an RF transmitter, an RF receiver, and a power source. The integrated circuit chip in the gateway RFID reader contains a memory. The gateway RFID reader has an RF transmitter that operates at the same frequency as the RFID readers, and may have a communications link to a remote central database. A remote central database has a microprocessor and a memory store. It may or may not be located on the same physical premises as the gateway RFID tag.

Transmitting range means the range over which signals transmitted from a transmitting device can be received by a receiving device.

In summary, an aspect of the invention is that data from an item that is not in the vicinity of an RFID reader, and thus not accessible directly from that reader, can nevertheless be accessed by that reader through the gateway RFID tag. The sequence of operations for accomplishing this involves transmitting an RFID signal between a first RFID reader and a first group of passive RFID tags, receiving at the first RFID reader first data from the first group of passive RFID tags, transmitting said first data from the RFID reader to a gateway RFID tag, receiving and storing the first data at the gateway RFID tag, transmitting an RFID signal between a second RFID reader and a second group of passive RFID tags, receiving at the second RFID reader second data from the second group of passive RFID tags, transmitting said second data from the RFID reader to the gateway RFID tag, receiving and storing the second data at the gateway RFID tag, transmitting to the gateway RFID tag a query from the first RFID reader, receiving the query at the gateway RFID tag, and transmitting second data from the gateway RFID tag to the first RFID reader.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. A method for radio frequency identification tracking comprising:

transmitting a radio frequency identification signal between a first radio frequency identification reader and a first group of passive radio frequency identification tags, receiving at the first radio frequency identification reader a first data from the first group of passive radio frequency identification tags in response to the transmitting the radio frequency identification signal between the first radio frequency identification reader and the first group of passive radio frequency identification tags, transmitting the first data from the first radio frequency identification reader to a gateway radio frequency identification tag, wherein the gateway radio frequency identification tag comprises an integrated circuit chip, a radio frequency transmitter, a radio frequency receiver, a power supply, and a radio frequency antenna, receiving and storing the first data at the gateway radio frequency identification tag, transmitting a radio frequency identification signal between a second radio frequency identification reader and a second group of passive radio frequency identification tags, receiving at the second radio frequency identification reader a second data from the second group of passive radio frequency identification tags in response to the transmitting the radio frequency identification signal between the second radio frequency identification reader and the second group of passive radio frequency identification tags, transmitting the second data from the second radio frequency identification reader to the gateway radio frequency identification tag, receiving and storing the second data at the gateway radio frequency identification tag, transmitting to the gateway radio frequency identification tag a query from the first radio frequency identification reader requesting the second data, receiving the query at the gateway radio frequency identification tag, and transmitting the second data from the gateway radio frequency identification tag to the first radio frequency identification reader in response to the receiving the query.

2. The method of claim 1 wherein the first data and the second data are transmitted from the gateway radio frequency identification tag to a central database.

3. The method of claim 2 wherein the first data and the second data are transmitted from the gateway radio frequency identification tag to the central database via a wireless network.

4. The method of claim 2 wherein the first data and the second data are transmitted from the gateway radio frequency identification tag to the central database via a wired network.

5. The method of claim 1 wherein the first data is transmitted from the first group of passive radio frequency identification tags to the first radio frequency identification reader at a first radio frequency and the first data is transmitted from the first radio frequency identification reader to the gateway radio frequency identification tag at a second radio frequency.

6. The method of claim 5 wherein the query is transmitted at the second radio frequency.

7. A radio frequency identification tracking system comprising:
  a first group of passive radio frequency identification tags,
  a gateway radio frequency identification tag,
  a first radio frequency identification reader having:
    a radio frequency transmitter for transmitting radio frequency signals to the first group of passive radio frequency identification tags,
    a radio frequency receiver for receiving tag data from the first group of passive radio frequency identification tags in response to the radio frequency transmitter transmitting the radio frequency signals to the first group of passive radio frequency identification tags,
    wherein the radio frequency transmitter is for transmitting the tag data from the first group of passive radio frequency identification tags to the gateway radio frequency identification tag, and for transmitting queries from the first radio frequency identification reader to the gateway radio frequency identification tag,
  a second group of passive radio frequency identification tags,
  a second radio frequency identification reader having:
    a second radio frequency transmitter for transmitting radio frequency signals to the second group of passive radio frequency identification tags,
    a second radio frequency receiver for receiving tag data from the second group of passive radio frequency identification tags in response to the second radio frequency transmitter transmitting the radio frequency signals to the second group of passive radio frequency identification tags,
    wherein the second radio frequency transmitter is for transmitting the tag data from the second group of passive radio frequency identification tags to the gateway radio frequency identification tag, and for transmitting queries from the second radio frequency identification reader to the gateway radio frequency identification tag,
  the gateway radio frequency identification tag having:
    a third radio frequency receiver for receiving tag data and queries from the first radio frequency identification reader and the second radio frequency identification reader,
    a memory for storing tag data from the first radio frequency identification reader and the second radio frequency identification reader,
    a third radio frequency transmitter for transmitting to the first radio frequency identification reader, in response to a query from the first radio frequency identification reader, the tag data received from the second radio frequency identification reader, and transmitting to the second radio frequency identification reader, in response to a query from the second radio frequency identification reader, the tag data received from the first radio frequency identification reader,
    an integrated circuit chip,
    a power supply, and
    a radio frequency antenna.

8. The system of claim 7 further including a central database connected to the gateway radio frequency identification tag via a network.

9. The system of claim 8 wherein the network is a wireless network.

10. The system of claim 8 wherein the network is a wired network.

11. The system of claim 7 wherein the radio frequency transmitter for transmitting the radio frequency signals to the first group of passive radio frequency identification tags operates at a first radio frequency and the radio frequency transmitter for transmitting the first data from the first radio frequency identification reader to the gateway radio frequency identification tag and for transmitting queries from the first radio frequency identification reader to the gateway radio frequency identification tag operates at a second radio frequency.

12. The system of claim 11 wherein the radio frequency transmitter for transmitting the query operates at the second radio frequency.

* * * * *